Sept. 22, 1959  H. J. SUNDAHL  2,905,415
PIPE HANGER
Filed Aug. 2, 1956

INVENTOR.
Harold J. Sundahl.
BY
William J. Ruano
HIS ATTORNEY.

United States Patent Office 2,905,415
Patented Sept. 22, 1959

2,905,415

PIPE HANGER

Harold J. Sundahl, Pittsburgh, Pa.

Application August 2, 1956, Serial No. 601,703

2 Claims. (Cl. 248—54)

This invention relates to a pipe hanger, and more particularly, to a pipe hanger which includes means for compensating for changes in loading caused by expansion in length of the pipe as a consequence of temperature changes of the pipe.

A common type of pipe hanger is the so-called counterpoise hanger, which is essentially a spring actuated counter-balance. A spring is incorporated in a system of linkages pivotally connected between the pipe and pipe supporting rod. The pipe weight compresses the spring against a fixed bottom plate of a pivotally movable cylindrical casing until the pipe weight and spring compression reach equilibrium. However, an outstanding disadvantage of such system is that it is relatively complicated and expensive in construction. Furthermore, there are numerous pivotally connected links, therefore substantial friction at the pivotal joints which enhances inertia of parts and prevents quick response to changes in loading. With initial changes in loading, no pivotal movement of the links occurs, but upon a predetermined change in loading a sudden pivotal movement occurs, but which may be too late to prevent abnormal stresses in the pipe supporting structure. Thus true or faithful compensation for changes in loading does not occur instantaneously which may result in abnormal stresses or damage to the pipe system.

An object of the present invention is to provide an improved pipe hanger assembly which will overcome the above mentioned disadvantages of counterpoise hangers.

Another object of my invention is to provide a pipe hanger which is quickly responsive to changes in length of the pipe itself as a consequence of changes in temperature of the fluid passing through the interior of the pipe which otherwise causes changes in loading, and which hanger is devoid of numerous pivotal links and inherent friction at the joints.

Figure 1:
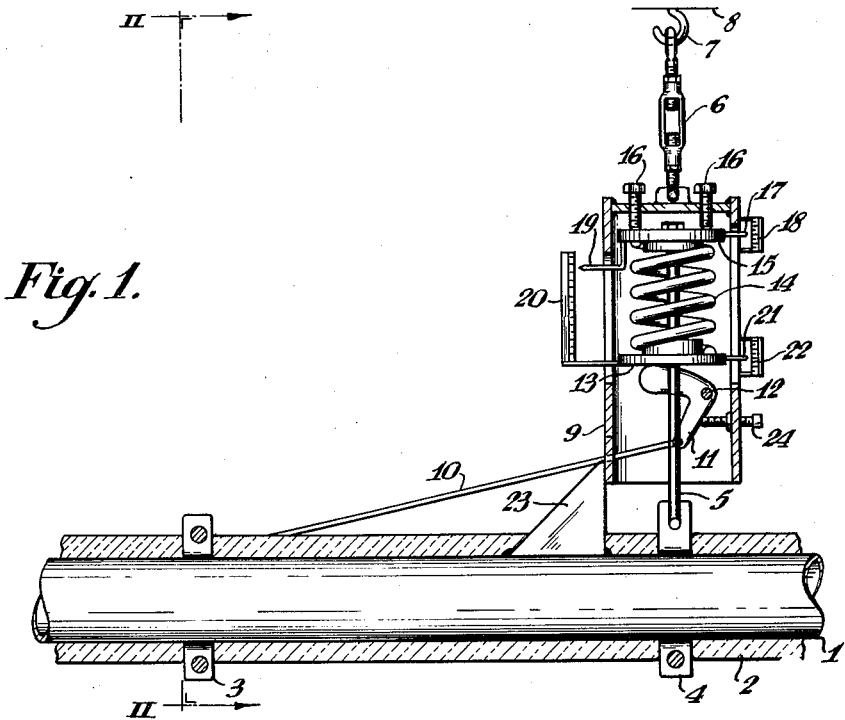
Figure 2:
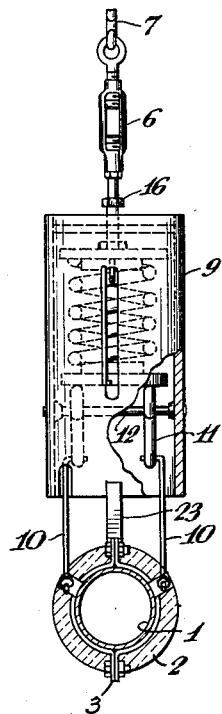

A still further object of this invention is to provide an efficient hanger assembly which is easily adjustable and which will quickly and accurately compensate for changes in temperature of the supported pipe. Other objects and advantages of the invention will become more apparent from a study of the following description taken with the accompanying drawings wherein:

Figure 1 is a side elevational view of a pipe hanger involving the principles of the present invention; and Figure 2 is a transverse, cross-sectional view taken along line II—II of Figure 1.

Referring more particularly to the drawing, numeral 1 denotes a pipe which conducts heated air, liquid, steam or other fluid, which pipe is covered by insulation 2. At longitudinally spaced points, pipe clamps 3 and 4 are provided which tightly encircle heat insulating gaskets (not shown) which directly surround the pipe 1. Supporting clamp 4 and the pipe 1 is a vertically extending rod 5 whose top end is connected to a top plate or disc 15 mounted in a hollow cylindrical casing 9. Casing 9 is suspended by means of a turn buckle 6 and eye which engage a hook 7 which is fastened to a fixed support 8, such as a ceiling.

A pair of actuating rods 10 are connected, at one of their ends, to clamp 3 and at the other of their ends, to cams or levers 11 which are pivotally mounted on a pin pivot 12. A single rod 10 and lever 13 can be used instead.

The free or top ends of the cams engage the bottom surface of a movable bottom plate or disc 13, which moves longitudinally in casing 9, being guided by a central hole surrounding rod 5. One end of a helical spring 14 is seated about an upstanding boss formed on the bottom plate 13, whereas the other end is seated about a similar boss projecting downwardly from top plate 15.

Adjusting screws 16 are provided on the top end of the cylinder to adjust the position of the top plate relative to the casing 9. A pointer 17 is rigidly secured to the top plate and co-operates with a scale 18 for denoting the position of the top plate within the cylinder. Another pointer 19 is rigidly secured to the movable top plate 15 for denoting, on scale 20, the relative positions of the top and bottom plates. And similarly, a pointer 21, secured to bottom plate 13, co-operates with a scale 22 for denoting the position of the bottom plate within the cylinder. The positions of the cams or levers 11 may be adjusted by means of an adjusting set screw 24.

Rigidly welded, or otherwise secured to an intermediate portion of the pipe 1, is a metallic stop 23 which is adapted to engage the bottom, outer wall portion of the casing 9.

In operation, when the temperature of the fluid in pipe 1 increases, the pipe will heat and expand in length, therefore the distance between clamps 3 and 4 will also increase.

Since actuating rods 10 are outside the pipe, they will remain relatively cool and will not expand in length. Thus, as the pipe expands, stop 23, located near clamp 4, will push against the bottom edge portion of the cylinder 9 whereby rods 10 will effect clockwise rotation of cams 11 about pivot pin 12 as an axis, thus raising the movable bottom plate 13 and compressing spring 14. This will compensate for the change in loading caused by expansion. That is, as pipe 1 buckles upwardly from expansion, thus relieving the compression of spring 14, this will be compensated for by clockwise rotation of levers 11 which restores the original compression. The amount of raising of plate 13 is determined by the lengths of the cam arms and of the actuating rods. Of course, when the temperature decreases, the opposite action takes place, that is, levers 11 will turn counter clockwise to lower bottom plate 13 and relieve the compression forces of spring 14.

If the pipe suspension were different, such as in the case wherein a suspended pipe is connected to a turbine on the floor, in which instance it is desired to relieve the spring when the pipe expands from heating, this may be accomplished by merely making the cams or levers of opposite hand and arrange them so that pushing of the casing by stop element 23 will effect lowering instead of lifting movement of bottom plate 13.

Thus it will be seen that I have provided an efficient pipe hanger that is devoid of complicated linkages, or a pivotally movable cylindrical housing, or similar parts having considerable friction and inertia, resisting such movements, therefore which are not quickly responsive to changes in loading; furthermore I have provided a pipe hanger which is directly responsive to changes in length of a supported pipe, caused by heating and expansion thereof in length; furthermore I have provided a relatively simple, inexpensive pipe hanger which is easily adjustable to compensate for varying load conditions, and including a spring, compression of which may be either increased or decreased in response to a determined increase in length of the pipe as a consequence of heating or expansion.

While I have illustrated and described a specific embodiment of my invention, it will be understood that this is by way of illustration only, and that various changes and modifications may be made within the contemplation of my invention and within the scope of the following claims.

I claim:

1. A hanger for yieldably suspending a pipe or similar object, comprising a support rod adapted to be suspended from a fixed support, a hollow cylindrical casing suspended from the bottom portion of said rod, a helical spring contained coaxially in said casing and being confined between a pair of elements which are relatively movable axially of the casing, one of said elements adapted to be connected to said pipe, cam lever means pivotally mounted in said casing so as to effect relative movement between said elements, actuating rod means connected to said cam lever means and to a longitudinally spaced point on said pipe relative to said first mentioned connection, and a stop element adapted to be secured to said pipe adjacent said casing and engageable with the bottom end portion thereof, whereby expansion in length of said pipe, such as from overheating thereof, will cause said stop element to be pushed against said casing to cause said actuating rods to pivot said cam lever means so as to change the compression of said spring and compensate for changes in loading of said spring due to changes in temperature and length of the pipe.

2. A pipe hanger, comprising a support rod adapted to be mounted on its top end to a fixed support, a hollow cylindrical casing suspended from the bottom end of said rod, a pair of longitudinally spaced clamps which are adapted to be fastened to a pipe, one of said clamps being connected to the bottom end of a rod extending axially through said casing, a top plate rigidly secured to the top end portion of said last mentioned rod, a vertically movable disc having a central hole encircling said last mentioned rod and vertically guided by said rod, a helical spring having one end seated on the bottom surface of the top plate and the other end seated on the top surface of said disc, a lever in said casing pivotally mounted on a transversely extending axis, and having one end engaging the bottom surface of said disc, an actuating rod having one end connected to the other end of said lever, and the other end connected to the other of said clamps, and a stop element adapted to be rigidly secured to said pipe adjacent said casing and near said first mentioned clamp and adapted to engage the bottom portion of the casing, whereby expansion in length of the pipe, as caused by increase in temperature thereof, will cause said stop to move against said cylinder and push it away from the far-most clamp and thus cause said lever to turn about said axis and change the compression of said spring so as to compensate for changes in loading caused by expansion in length of said pipe.

References Cited in the file of this patent

UNITED STATES PATENTS

| 814,988 | Stuart | Mar. 13, 1906 |
| 2,421,822 | Wood | June 10, 1947 |
| 2,656,997 | Holmen | Oct. 27, 1953 |
| 2,841,347 | Moloney | July 1, 1958 |